(12) United States Patent
Yan et al.

(10) Patent No.: US 11,580,400 B1
(45) Date of Patent: Feb. 14, 2023

(54) OPTIMIZER BASED PRUNNER FOR NEURAL NETWORKS

(71) Applicant: Snap Inc., Santa Monica, CA (US)

(72) Inventors: Enxu Yan, Los Altos, CA (US); Sergey Tulyakov, Marina del Rey, CA (US); Aleksei Podkin, London (GB); Aleksei Stoliar, Marina del Rey, CA (US)

(73) Assignee: Snap Inc., Santa Monica, CA (US)

( * ) Notice: Subject to any disclaimer, the term of this patent is extended or adjusted under 35 U.S.C. 154(b) by 682 days.

(21) Appl. No.: 16/586,635

(22) Filed: Sep. 27, 2019

(51) Int. Cl.
| | | |
|---|---|---|
| G06N 3/08 | (2006.01) | |
| G06N 3/082 | (2023.01) | |
| G06N 3/04 | (2023.01) | |
| G06F 17/16 | (2006.01) | |
| G06T 7/10 | (2017.01) | |

(52) U.S. Cl.
CPC ............ *G06N 3/082* (2013.01); *G06F 17/16* (2013.01); *G06N 3/04* (2013.01); *G06T 7/10* (2017.01); *G06T 2207/20081* (2013.01); *G06T 2207/20084* (2013.01)

(58) Field of Classification Search
CPC combination set(s) only.
See application file for complete search history.

(56) References Cited

U.S. PATENT DOCUMENTS

| | | | |
|---|---|---|---|
| 2017/0203335 A1* | 7/2017 | Benyoub | G06V 30/1914 |
| 2018/0260984 A1* | 9/2018 | Severenuk | G06V 30/32 |
| 2019/0188567 A1* | 6/2019 | Yao | G06N 3/04 |

OTHER PUBLICATIONS

Gale, Trevor, et al., "The State of Sparsity in Deep Neural Networks", arXiv:1902.09574v1 [cs.LG], (Feb. 25, 2019), 15 pgs.

Han, Song, et al., "Deep Compression: Compressing Deep Neural Networks with Pruning, Trained Quantization and Huffman Coding", arXiv preprint, arXiv:1510.00149v5, (Jan. 19, 2016), 14 pgs.

Molchanov, Dmitry, et al., "Variational Dropout Sparsifies Deep Neural Networks", Proceedings of the 34th International Conference on Machine Learning, Sydney, Australia, PMLR 70, (2017), 10 pgs.

Zhang, Richard, et al., "The Unreasonable Effectiveness of Deep Features as a Perceptual Metric", Proceedings of the IEEE Conference on Computer Vision and Pattern Recognition,, (2018), 586-595.

* cited by examiner

*Primary Examiner* — Zhiyu Lu
(74) *Attorney, Agent, or Firm* — Schwegman Lundberg & Woessner, P.A.

(57) ABSTRACT

A neural network pruning system can sparsely prune neural network models using an optimizer based approach that is agnostic to the model architecture being pruned. The neural network pruning system can prune by operating on the parameter vector of the full model and the gradient vector of the loss function with respect to the model parameters. The neural network pruning system can iteratively update parameters based on the gradients, while zeroing out as many parameters as possible based a preconfigured penalty.

20 Claims, 18 Drawing Sheets

OPTIMIZER BASED PRUNNER FOR NEURAL NETWORKS

TECHNICAL FIELD

The present disclosure generally relates to special-purpose machines that manage data processing and improvements to such variants, and to the technologies by which such special-purpose machines become improved compared to other special-purpose machines for implementing optimized neural networks.

BACKGROUND

Machine learning schemes, such as deep neural networks (DNNs) can be implemented to perform computer vision tasks, such as classification, detection, tracking, and semantic segmentation. However, the accuracy of these types of machine learning schemes often comes with the expensive cost in storage and computation—typically millions of parameters and billions of floating-point operations (FLOPs). While such costs may be practical on high performing computing clusters, these approaches too expensive to be deployed on edge devices, such as mobile phones, smart sensors, and autonomous drones or robots.

BRIEF DESCRIPTION OF THE DRAWINGS

To easily identify the discussion of any particular element or act, the most significant digit or digits in a reference number refer to the figure ("FIG.") number in which that element or act is first introduced.

DETAILED DESCRIPTION

Figure 1:
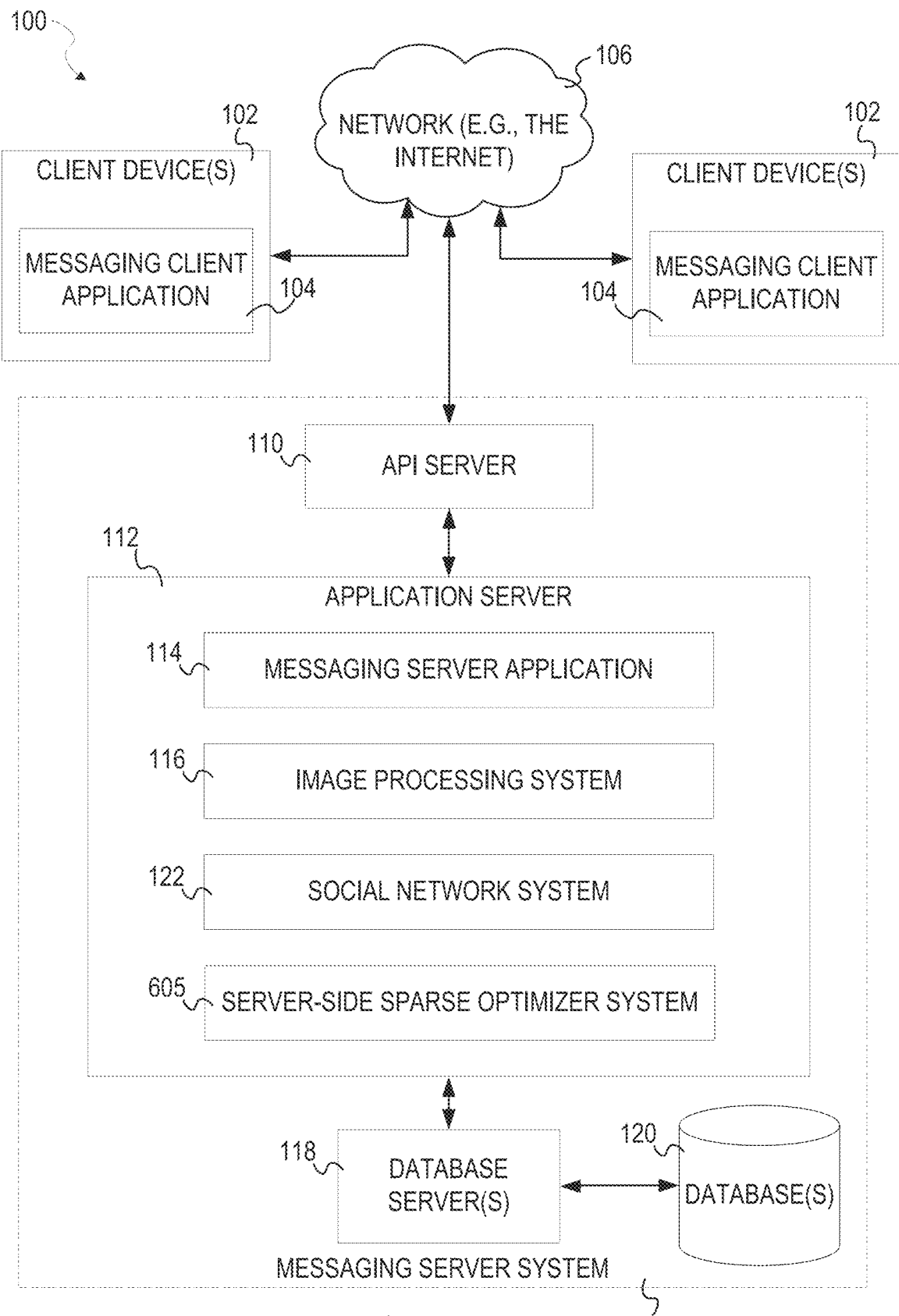
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Large neural network models may yield quality results but are difficult to efficiently execute on resource-constrained devices, such as mobile phones, which have limited memory, limited processor power, and limited network data bandwidth. To this end, a sparse optimizer system can be implemented to prune neural networks, such as deep generative model (DGM) neural networks. Generative neural networks are different than other types of networks, such as object classifier neural networks, in that generative neural networks generate data using trained data whereas other neural networks merely classify it. Optimizing DGMs without modifying the trained model is difficult and past conventional approaches rely on modifying the DGMs to optimize them.

The sparse optimizer system is configured to compress the model size of a DGM through sparsifying the number of non-zero parameters in the model. The algorithm implemented by the sparse optimizer system is configured in a way such that the architecture of the network to be pruned (e.g., a DGM) is transparent to the optimizer; that is, the optimizer need not be specially customized for the model to be optimized. In this way, the sparse optimizer system can more simply be integrated with a wide variety of different networks as an independent software module that is bolted onto model to be reduced, such as a generative neural network, which then can be distributed and implemented in mobile applications, such as a social network site mobile application.

Network pruning is a computational task in which the model size and inference time (run-time) of a machine learning scheme is reduced so that the reduced-size machine learning scheme can more readily be distributed and executed on resource-scarce devices, such as mobile phones. Two types of network pruning include channel pruning (e.g., structured pruning or filter pruning) and sparse pruning (e.g., connection pruning or synaptic pruning): the former removes a channel as a whole while and latter prunes each weight parameter individually. Channel pruning is an architecture search algorithm that outputs a new network of reduced layer width, and therefore the speedup can be directly achieved with standard convolution operation kernels. However, channel pruning searches in a much smaller space of networks than that of sparse pruning, and thus results in less significant model compression than a sparse pruning approach. For example, within 1% of loss in accuracy, conventional channel pruning, and sparse pruning approaches result in approximately 2× and 10× reduction in model sizes respectively for ResNet50 on ImageNet models. On the other hand, conventional sparse pruning, despite its higher compression ratio over channel pruning, outputs sparse networks that require different implementations of convolution kernels to achieve actual speedups proportional to the pruning ratio.

Further, many conventional pruning approaches require custom pruning-related layers (e.g., masks or dropout layers) that are specially configured and inserted into the deep neural network to be pruned. This has made it hard to separate the pruning process as a software module independent of the model architecture, which becomes especially troublesome for deep generative models (DGMs) that contain diverse types of layers.

The sparse optimizer system addresses issues by being configured to be oblivious or agnostic to the underlying model structure to be pruned. In some example embodiments, the sparse optimizer system only accesses (1) the parameter vector of the full model to be pruned, and (2) the gradient vector of the loss function with respect to the model parameters (e.g., gradient vectors implemented to generate parameters in the parameter vector). Further, according to some example embodiments, the sparse optimizer system iteratively updates the parameters based on the gradients, while at the same time encouraging as many non-parameters to be zeros as possible based on an L1-cumulative penalty, discussed in further detail below.

FIG. 1 shows a block diagram of an example messaging system 100 for exchanging data (e.g., messages and associated content) over a network 106. The messaging system 100 includes multiple client devices 102, each of which hosts a number of applications including a messaging client application 104. Each messaging client application 104 is communicatively coupled to other instances of the messaging client application 104 and a messaging server system 108 via the network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video, or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality within either the messaging client application 104 or the messaging server system 108 is a design choice. For example, it may be technically preferable to initially deploy certain technology and functionality within the messaging server system 108, and to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an application programming interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client devices 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to a messaging server application 114 for possible access by another messaging client application 104; the setting of a collection of media data (e.g., a story); the retrieval of such collections; the retrieval of a list of friends of a user of a client device 102; the retrieval of messages and content; the adding and deletion of friends to and from a social graph; the location of friends within the social graph; and opening application events (e.g., relating to the messaging client application 104).

The application server 112 hosts a number of applications and subsystems, including the messaging server application 114, an image processing system 116, a social network system 122, and a server-side sparse optimizer system 605. The messaging server application 114 implements a number of message-processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes the image processing system 116, which is dedicated to performing various image processing operations, typically with respect to images or video received within the payload of a message at the messaging server application 114.

The social network system 122 supports various social networking functions and services, and makes these functions and services available to the messaging server application 114. To this end, the social network system 122 maintains and accesses an entity graph (e.g., entity graph 304 in FIG. 3) within the database 120. Examples of functions and services supported by the social network system 122 include the identification of other users of the messaging system 100 with whom a particular user has relationships or whom the particular user is "following," and also the identification of other entities and interests of a particular user. The application server 112 is communicatively coupled to a database server 118, which facilitates access to a database 120 in which is stored data associated with messages processed by the messaging server application 114. The server-side sparse optimizer system 605 manages server side functions of the sparse optimizer system in a client-server configuration, according to some example embodiments. Further details of the server-side sparse optimizer system 605 are discussed below with reference to FIG. 6A.

Figure 2:
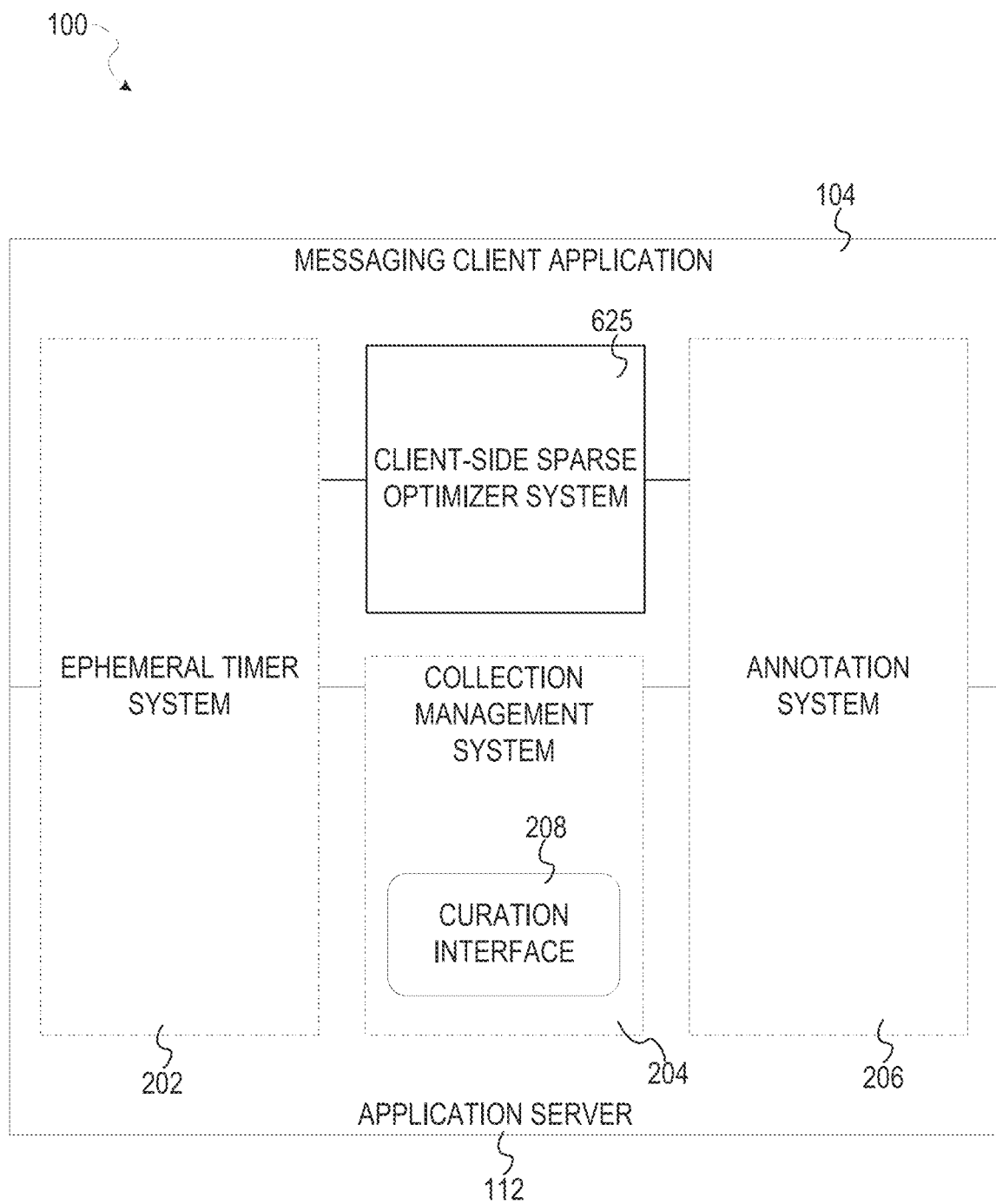
FIG. 2 is a block diagram illustrating further details regarding the messaging system of FIG. 1, according to example embodiments.

FIG. 2 is a block diagram illustrating further details regarding the messaging system 100, according to example embodiments. Specifically, the messaging system 100 is shown to comprise the messaging client application 104 and the application server 112, which in turn embody a number of subsystems, namely an ephemeral timer system 202, a collection management system 204, an annotation system 206, and client-side sparse optimizer system 625.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message or collection of messages (e.g., a story), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a geofilter or filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, text, logos, animations, and sound effects. An example of a visual effect includes color overlaying. The audio and visual content or the visual effects can be applied to a media content item (e.g., a photo) at the client device 102. For example, the media overlay includes text that can be overlaid on top of a photograph generated by the client device 102. In another example, the media overlay includes an identification of a location (e.g., Venice Beach), a name of a live event, or a name of a merchant (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map and upload content associated with the selected geolocation. The user may also specify circumstances under which particular content should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time.

The client-side sparse optimizer system 625 manages client side functions of the sparse optimizer system in a client-server configuration, according to some example embodiments. Further details of the client-side sparse optimizer system 625 are discussed below with reference to FIG. GB.

Figure 3:
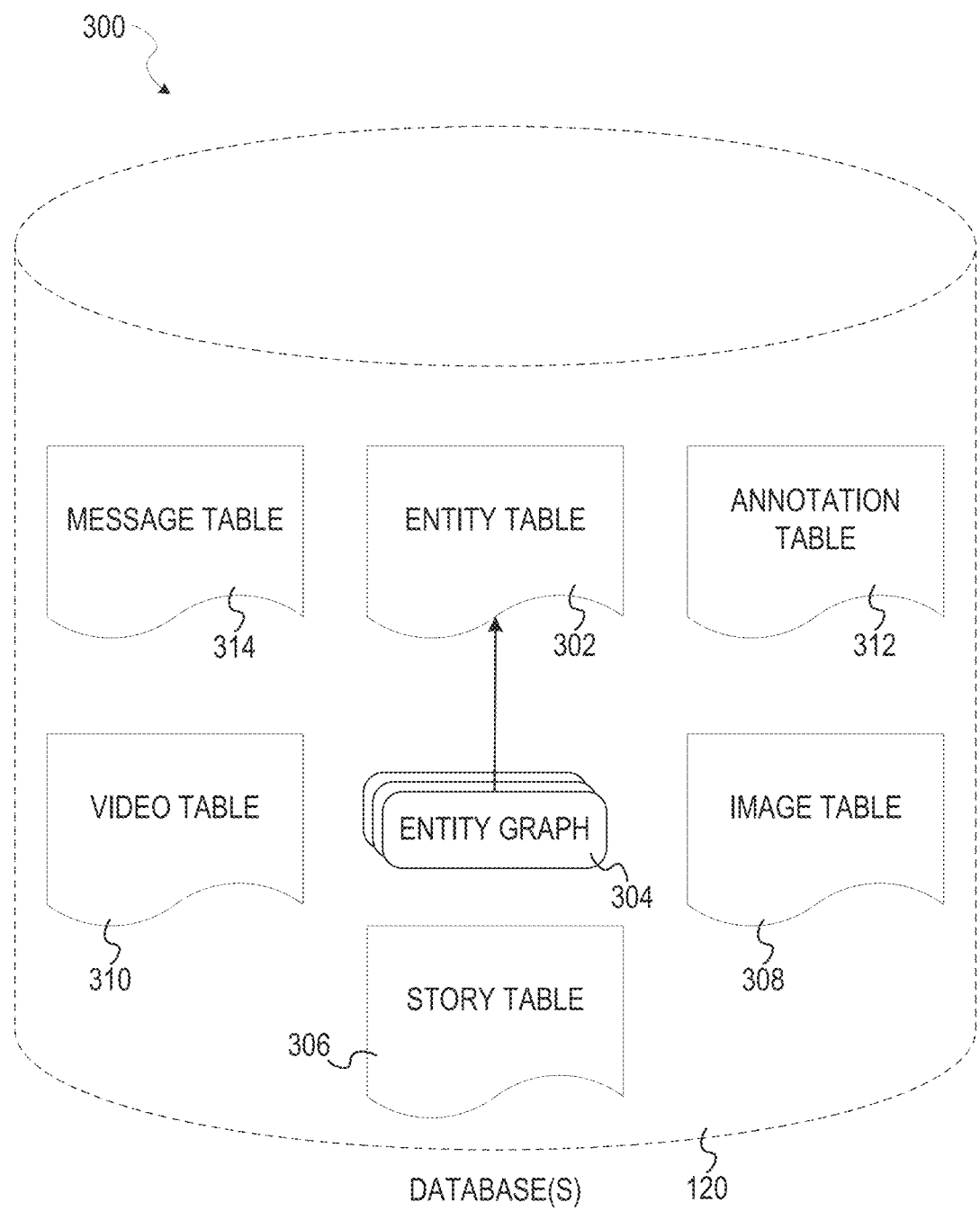
FIG. 3 is a schematic diagram illustrating data which may be stored in a database of a messaging server system, according to certain example embodiments.

FIG. 3 is a schematic diagram illustrating data 300 which may be stored in the database 120 of the messaging server system 108, according to certain example embodiments. While the content of the database 120 is shown to comprise a number of tables, it will be appreciated that the data 300 could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between or among entities. Such relationships may be social, professional (e.g., work at a common corporation or organization), interest-based, or activity-based, for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the message table 314. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story or a gallery). The creation of a particular collection may be initiated by a particular user (e.g., each user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location or event at a particular time may, for example, be presented with an option, via a user interface of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
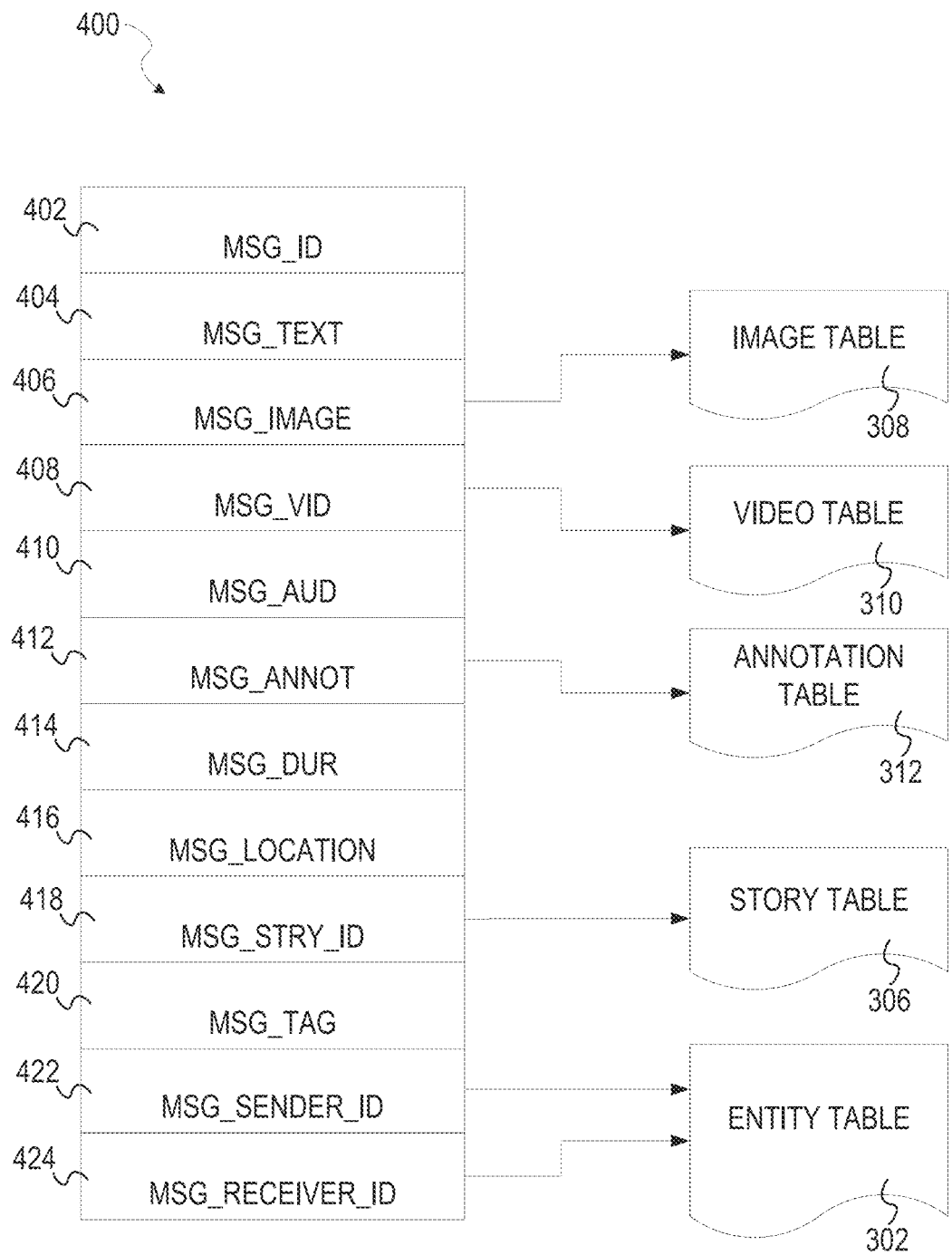
FIG. 4 is a schematic diagram illustrating a structure of a message, according to some embodiments, generated by a messaging client application for communication.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data captured by a camera component of a client device 102 or retrieved from memory of a client device 102, and that is included in the message 400.

A message video payload 408: video data captured by a camera component or retrieved from a memory component of the client device 102, and that is included in the message 400.

A message audio payload 410: audio data captured by a microphone or retrieved from the memory component of the client device 102, and that is included in the message 400.

Message annotations 412: annotation data (e.g., filters, stickers, or other enhancements) that represents annotations to be applied to the message image payload 406, message video payload 408, or message audio payload 410 of the message 400.

A message duration parameter 414: a parameter value indicating, in seconds, the amount of time for which content of the message 400 (e.g., the message image payload 406, message video payload 408, and message audio payload 410) is to be presented or made accessible to a user via the messaging client application 104.

A message geolocation parameter 416: geolocation data (e.g., latitudinal and longitudinal coordinates) associated with the content payload of the message 400. Multiple message geolocation parameter 416 values may be included in the payload, with each of these parameter values being associated with respective content items included in the content (e.g., a specific image in the message image payload 406, or a specific video in the message video payload 408).

A message story identifier 418: values identifying one or more content collections (e.g., "stories") with which a particular content item in the message image payload 406 of the message 400 is associated. For example, multiple images within the message image payload 406 may each be associated with multiple content collections using identifier values.

A message tag 420: one or more tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent.

A message receiver identifier 424: an identifier (e.g., a messaging system identifier, email address, or device identifier) indicative of a user of the client device 102 to which the message 400 is addressed.

The contents (e.g., values) of the various components of the message 400 may be pointers to locations in tables within which content data values are stored. For example, an image value in the message image payload 406 may be a pointer to (or address of) a location within the image table 308. Similarly, values within the message video payload 408 may point to data stored within the video table 310, values stored within the message annotations 412 may point to data stored in the annotation table 312, values stored within the message story identifier 418 may point to data stored in the story table 306, and values stored within the message sender identifier 422 and the message receiver identifier 424 may point to user records stored within the entity table 302.

Figure 5:
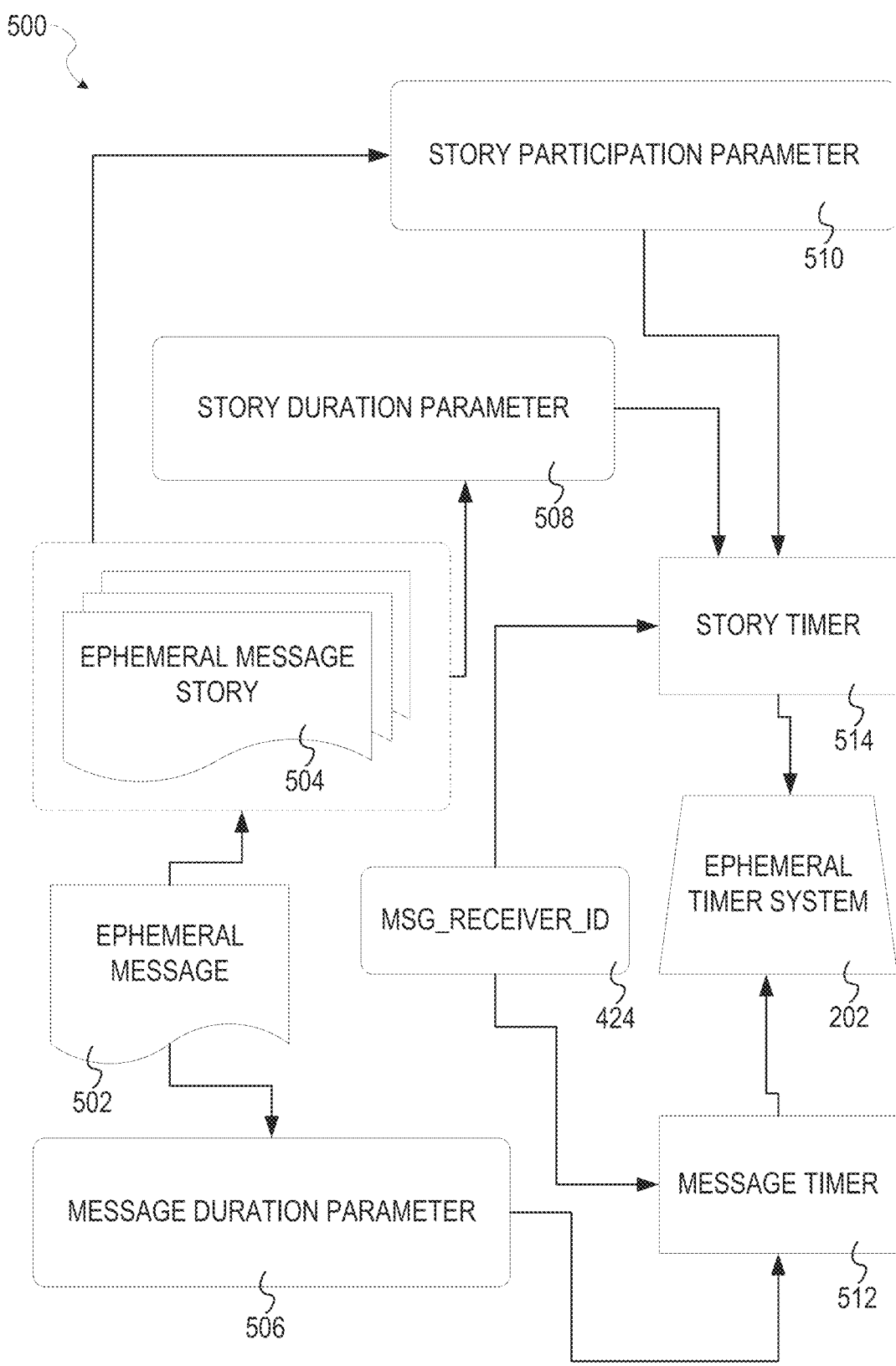
FIG. 5 is a schematic diagram illustrating an example access-limiting process, in terms of which access to content (e.g., an ephemeral message, and associated multimedia payload of data) or a content collection (e.g., an ephemeral message story) may be time-limited (e.g., made ephemeral), according to some example embodiments.

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral), according to some example embodiments.

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is an application client, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal story, or an event story). The ephemeral message story 504 has an associated story duration parameter 508, a value of which determines a time duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message 502 may "expire" and become inaccessible within the context of the ephemeral message story 504, prior to the ephemeral message story 504 itself expiring in terms of the story duration parameter 508.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In response to the ephemeral timer system 202 determining that an ephemeral message story 504 has expired (e.g., is no longer accessible), the ephemeral timer system 202 communicates with the messaging system 100 (e.g., specifically, the messaging client application 104) to cause an indicium (e.g., an icon) associated with the relevant ephemeral message story 504 to no longer be displayed within a user interface of the messaging client application 104.

Figure 6A:
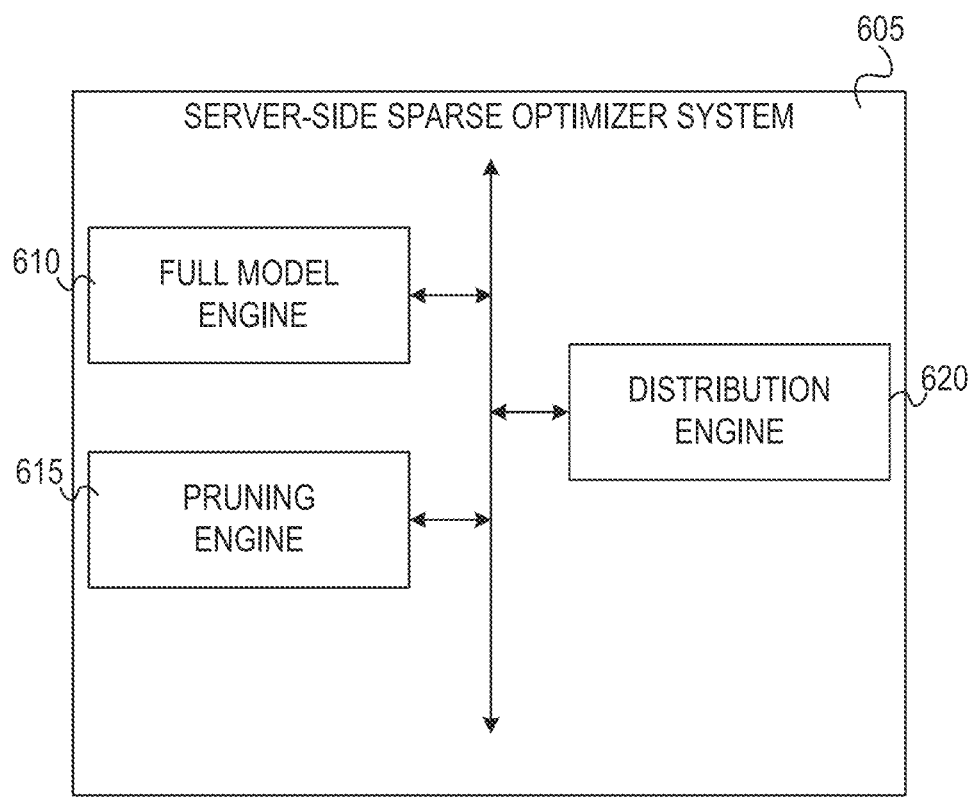
FIGS. 6A and 6B show example implementations of a sparse pruner system, according to some example embodiments.
Figure 6B:
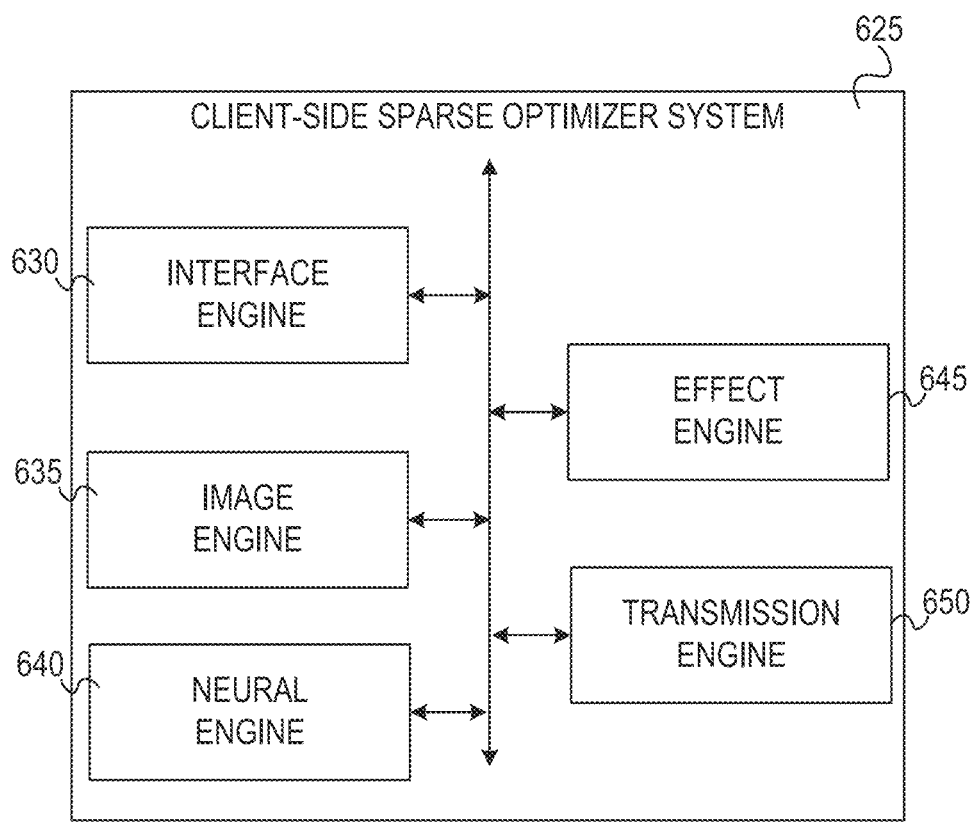

FIGS. 6A and 6B show example implementations of a sparse optimizer system as separate instances run from the server-side via server-side sparse optimizer system 605 and client-side sparse optimizer system 625. Although the sparse optimizer system is discussed below in a client-server configuration, it is appreciated that the sparse optimizer system can be fully implemented on a single machine, such as a desktop workstation, a smartphone (e.g., a high-speed smartphone), a laptop, a distributed computer system, and so on.

FIG. 6A shows example internal functional engines of a server-side sparse optimizer system 605, according to some example embodiments. As illustrated, the server-side sparse optimizer system 605 comprises a full model engine 610, a pruning engine 615, and a distribution engine 620. The full model engine 610 is configured to train a full neural network model (ResNet, ImageNet, MobileNet) to perform an image processing task, e.g., object feature detection, semantic segmentation, style transfer. The pruning engine 615 is configured to apply a sparse pruning optimizer that is agnostic to the model being optimized, as discussed in further detail below. The distribution engine 620 is configured to transmit a pruned neural network model to a plurality of user devices, such as client device 102.

FIG. 6B shows internal functional engines of a client-side sparse optimizer system 625, according to some example embodiments. As illustrated, the client-side sparse optimizer system 625 comprises an interface engine 630, an image engine 635, a neural engine 640, an effect engine 645, and a transmission engine 650. The interface engine 630 is configured to receive model data from the server-side sparse optimizer system 605 and generate one or more interfaces for interaction with the user of a client device touchscreen graphical user interfaces). The image engine 635 is configured to generate image data (e.g., an image, an image sequence, video data, live video generated displayed in real-time or near real-time on the display device of the client device). The generated image data can be processed and included in a network post, such as an ephemeral message 504.

The neural engine 640 is configured to apply a pruned model received from the server-side sparse optimizer system 605 to the image data generated by the image engine 635. For example, the neural engine 640 can implement a sparse pruned version of a semantic segmentation neural network to an image to segment the image into image mask areas or segments, as discussed in further detail below. The effect engine 645 is configured to apply image modifications. For example, the effect engine 645 can use the mask data generated by the neural engine 640 to replace one or more areas of the image using the mask data. For instance, the effect engine 645 can identify a hair segment in the image using a hair segment mask to recolor a user's hair from an initial color (e.g. brown hair) to a new hair color (e.g., purple hair). The transmission engine 650 is configured to store otherwise to publish the modified image data as an ephemeral message, e.g. ephemeral message 504.

Figure 7:
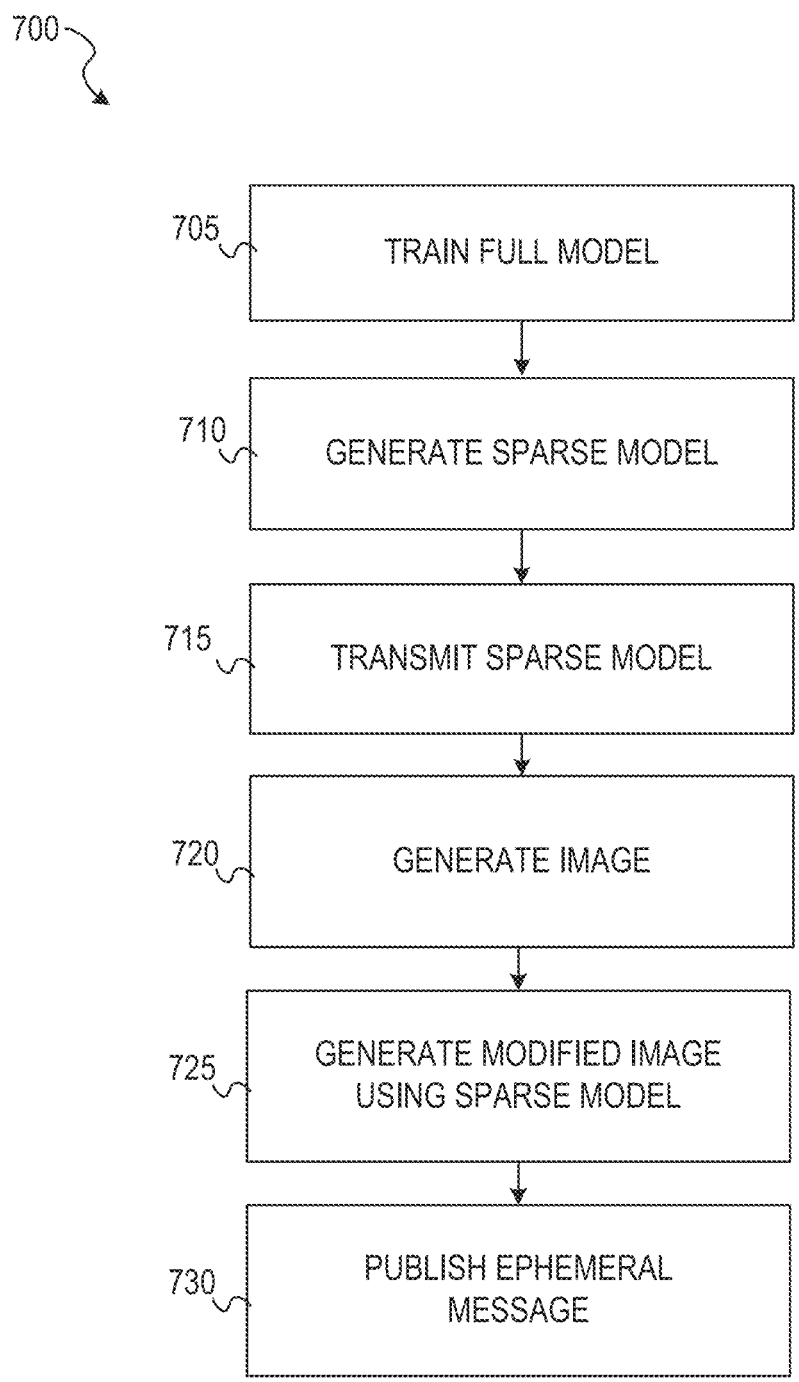
FIG. 7 shows an example flow diagram of a method for implementing an optimizer based sparse pruner system, according to some example embodiments.

FIG. 7 shows an example flow diagram of a method 700 for implementing an optimizer based sparse pruner system, according to some example embodiments. At operation 705, the full model engine 610 trains a full generative neural network model to perform an image processing task, such as generative image tasks. At operation 710, the pruning engine 615 generates a sparse model by pruning the trained model that is output by the full model engine 610. For example, at operation 710, the pruning engine 615 access a parameter vector of the full generative neural network and accesses the gradient vector of the full generative neural network, and then sparsely prunes the individual parameters based on the gradient data. At operation 715, the distribution engine 620 transmits the newly generated sparse model to a plurality of edge devices, such as client devices, security cameras, autonomous vehicle navigation systems. Due to model being pruned, the model has a reduced memory footprint that is more easily transmitted to edge devices over a network (e.g., the Internet). Furthermore, due to the small footprint of the reduced size model, the resource constrained client device can more readily execute the reduced size model as less data overhead is required and inference time at run-time is thereby reduced.

At operation 720, the image engine 635 generates image data. For example, at operation 720, the image engine 635 uses an image sensor of the client device to generate image data or video data.

At operation 725, the neural engine 640 generates image data using the sparsely pruned model. For example, at operation 725 the neural engine 640 applies the pruned model to the image to generate an image mask data labelling a hair region of a user depicted in the image. After the hair mask is generated, the effect engine 645 then applies an image effect to the hair depicted in the image (e.g., changing the color or shape of the user's hair in the image). At operation 730, the transmission engine 650 publishes the modified image data on a network. For example, at operation 730, the transmission engine 650 publishes the modified video sequence as an ephemeral message 504.

Figure 8A:
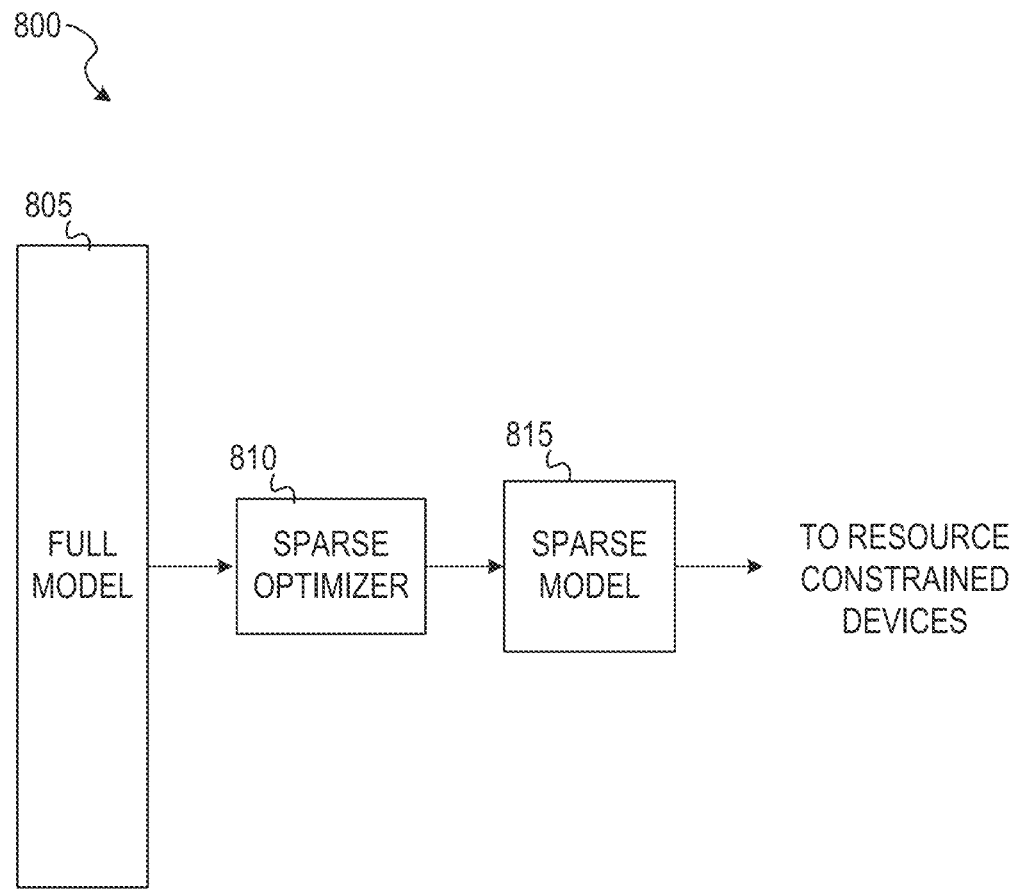
FIGS. 8A and 8B show example data structures for implementing a sparse pruner system, according to some example embodiments.

FIG. 8A shows an example data structure 800 for generating a pruned model, according to some example embodiments. A high-level overview of the sparse optimizer pruning system is here discussed, followed by an in-depth implementation. At a high-level, the full model 805 is input into a sparse optimizer 810 (e.g., as run by the pruning engine 615 on the server-side sparse optimizer system 605). The sparse optimizer 810 is configured to prune individual weight parameters of the full model on a per weight basis with respect to gradient data, without pruning entire channels, thereby maintaining more degrees of freedom in the pruned neural model, which results in higher quality model output data. After pruning, the sparse optimizer stores the reduced sparse model 815 and/or transmits the reduced model to client devices for implementation.

According to some example embodiments, the sparse optimizer 810 is configured as follows: Assume a deep-generative model takes the form D(E(X)), where X is a source signal (e.g., image, video, text, audio), E(.) is an encoder that transforms the source signal X into a semantic tensor that extracts and alters the high-level information about X, and D(.) is a decoder that transforms the semantic tensor back to the signal domain. In some implementations, an encoder is not necessary, and the model can be described directly as D(Z), where Z is a random vector and D(.) is a generator that turns a random vector directly into the signal domain.

In some example embodiments, the encoder E(.) and decoder D(.) are parameterized by a collection of variables w, and the goal of learning DGMs is to tune the parameter w such that the distribution of generated signals D(E(X) (or D(Z)) matches the distribution of the target signals Y, that is: $p_X\{D(E(X)\} \approx p_Y\{Y\}$. To achieve this, a loss function L(.) is introduced to penalize the discrepancy between two probability distributions: $L(p_X\{D(E(X)\} \approx p_Y\{Y\})$. In practice, one can only collect finite samples of $p_X$ and $p_Y$ from the distribution, the loss function used in practice penalize the discrepancy between two finite sample sets: $\{X\}_{n=1}^N$, $\{Y\}_{m=1}^M$, and: $L(\{D(E(X)\}_{n=1}^N, \{Y\}_{m=1}^M)$.

The goal of training a DGM is to solve the following optimization problem: $\min_w$, $L(p_X\{D_w(E_w(X)\}, p_Y\{Y\})$, where w is the collection of parameters controlling the effect of encoder and decoder. In some example embodiments, the training goal of the sparse pruning optimizer is to find the values of w such that: (1) the loss in above optimization problem is as small as possible, and (2) the non-zero parameters in w are as few as possible. In some example embodiments, the sparse optimizer 810 achieves this at least in part by only accessing the gradient $g=\nabla_w L$ of the above loss function with respect to the parameters, without knowing the specific architecture of E(.) and D(.). This feature helps separate the pruning mechanism of the system as an independent software module without requiring changes to the codebase related to the model architecture.

In some example embodiments, sparse optimizer 810 implements a L1-cumulative feature that modifies a stochastic gradient based algorithm to stabilize values of the pruned elements $\{w_j|w_j=0\}$. Here we generalize L1-cumulative as a decorator for any stochastic gradient algorithms to optimize an $l_1$-regularized objective with sparse support.

Algorithms based on the stochastic gradient $\tilde{g} \approx \nabla L$ have updates of the form:

$$w^{t+1} = w^t - \eta_t \cdot \Gamma(\tilde{g} + \lambda \text{sign}(w^t), \theta^t) \theta^{t+1} = \Theta(\tilde{g} + \lambda \text{sign}(w^t), \theta^t) \quad \text{Equation 1}$$

where $\theta^t$ are algorithmic parameters, such as a momentum term. Since the $l_1$ regularizer has gradient $\lambda \text{sign}(w^t)$ discontinuous at 0, leading to zigzagging behavior of $w_j^t$ around 0, a proximal gradient update changes Equation 1 into the form:

$$w^{t+\frac{1}{2}} = w_i^t - \eta_t \cdot \Gamma(\tilde{g}^t, \theta^t),$$
$$\theta^{t+1} = \Theta(\tilde{g}^t, \theta^t)$$
$$w^{t+1} = SoftThd\left(w^{t+\frac{1}{2}}, \eta_t \cdot \lambda\right)$$

Equation 2

However, the stochastic gradients $g^t$ could have a large variance that drags pruned parameters $\{w_j | w_j = 0\}$ away from 0 even when its expectation has a small magnitude $|E[g_j^t]|$. The L1-cumulative method improves Equation 2 further by reducing variance of the updates through a cumulative bank $$\mu_t := \sum_{k=1}^{t} \lambda \eta_k$$

and consumes it whenever there is a change $(\omega_j^{t+1} + \omega_j^{t+1/2})$ towards 0 contributed by the $l_1$ penalty. Then the unconsumed $l_1$ penalty at each step t can be obtained $\mu_t - q_j^t$ where $$q_j^t = \sum_{k=1}^{t-1} \text{sign}(\omega_j^{t+1/2})(\omega_j^{k+1} - \omega_j^{k+1/2})$$

is the cumulative consumption of the penalty. This stabilizes the update in Equation 2 into:

$$w^{t+\frac{1}{2}} = w_i^t - \eta_t \cdot \Gamma(\tilde{g}^t, \theta^t),$$
$$\theta^{t+1} = \Theta(\tilde{g}^t, \theta^t)$$
$$w_j^{t+1} = SoftThd\left(w_j^{t+\frac{1}{2}}, \mu_t - q_j^t\right), j = 1 \ldots D.$$

Equation 3

Figure 8B:
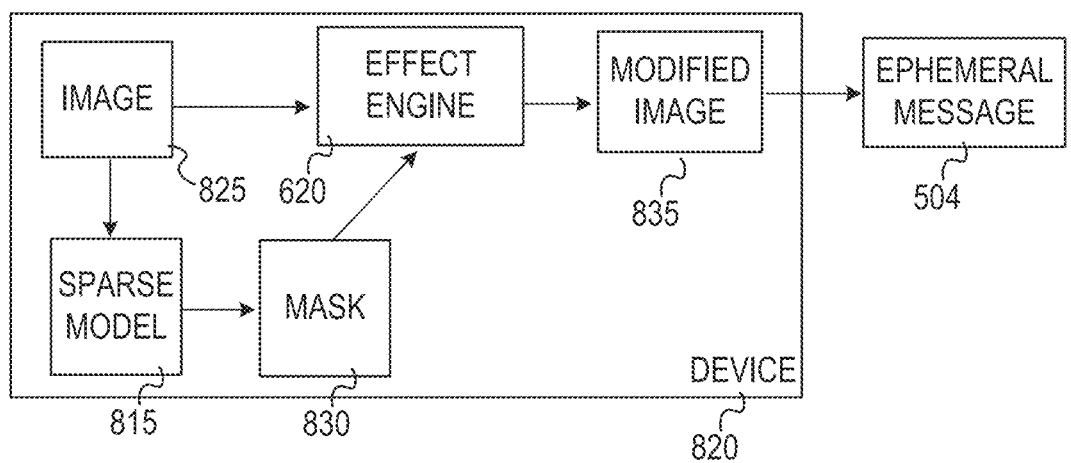

FIG. 8B shows an example sparse model be implemented on a device 820 (e.g., edge device, client device, smartphone, navigation system, security camera), according to some example embodiments. The device 820 receives the sparse model 815 and stores it locally on the device 820. Further, the device 820 then generates an image 825. The sparse model 815 is applied to the image 825 to generate image mask data 830. The effect engine 645 can receive the image 825 and the mask 830 as input data to 645 a modified image 835. For example, the effect engine 645 may use the image mask data 830 to identify a region face region, hair region) within the image 825 to perform image processing (e.g., color replacement). After the modified image we hundred 35 is generated, it may be published to a network server as electronic message, such as ephemeral message 504.

Figure 9A:
FIGS. 9A-9C illustrate example user interfaces for implementing a reduced size model pruned by the sparse pruning optimizer segmentation system, according to some example embodiments.
Figure 9B:
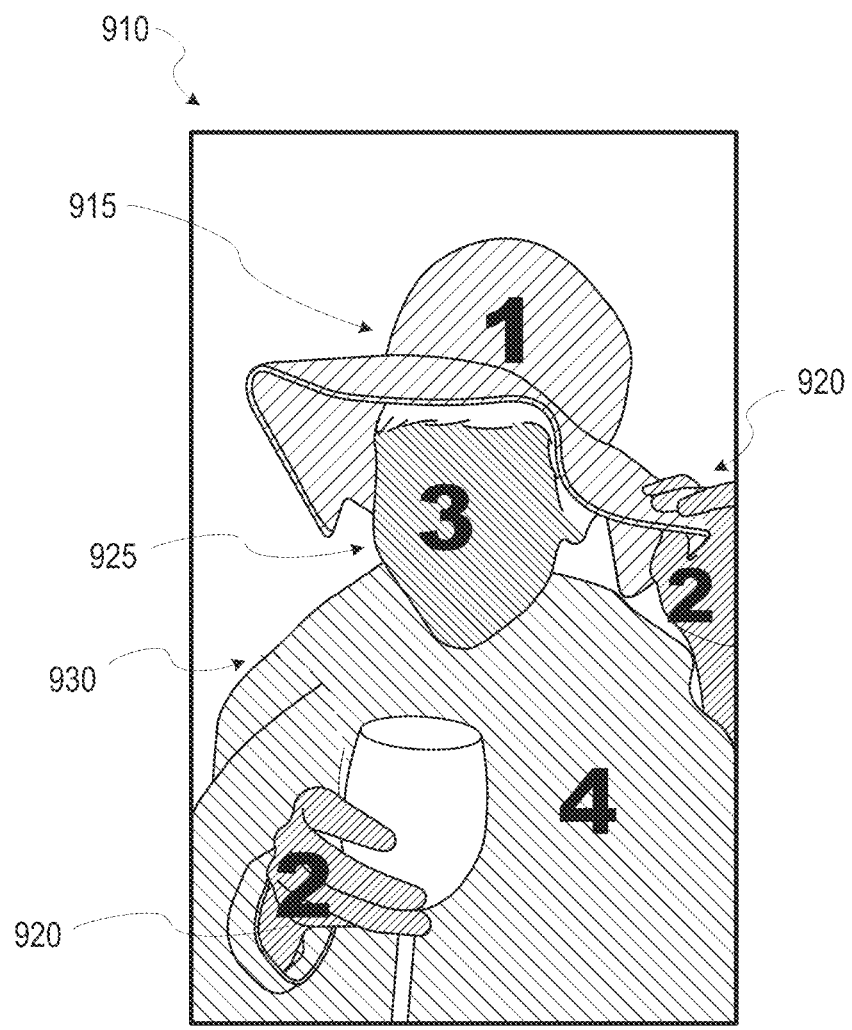
Figure 9C:

FIGS. 9A-9C illustrate example user interfaces for implementing a reduced size model pruned by the sparse pruning optimizer segmentation system, according to some example embodiments. As illustrated in FIG. 9, image 900 is an example of an image captured at operation 720 of FIG. 7. The image 900 depicts a smiling girl holding her hat and a tasty beverage. The image 900 may be a current frame of a video sequence, where previous frames captured before the current frame were previously displayed on the client device. A user (e.g., the girl or another person holding a mobile device taking a picture of the girl) may have selected button 905 to initiate styling of the image 900 using a pruned neural network trained to generate image mask data using semantic segmentation, where image masks may be required to perform the requested styling (e.g., the image mask is a face area mask that labels pixels depicting the face area of the girl).

Responsive to selection of the button 905 image segmentation is performed as discussed above. For example, a full semantic segmentation neural network is significantly reduced via the sparse optimizer 810 to generate a reduced model semantic segmentation neural network, which can be implemented against each frame in real-time or near real-time by the mobile device.

FIG. 9B shows an example segmented image 910, which has been derived by performing image segmentation on image 900 of FIG. 9A using the client-side sparse optimizer system 625. The segmented image 910 denotes different areas of the image, including for example a hat area 915 (labeled "1"), skin areas that are not part of the face 920 (labeled "2"), a face area 925 (labeled "3"), and a clothes area 930 (labeled "4"). The different label values may be included as channel data for each pixel (e.g., a fourth channel in addition to RGB (Red/Blue/Green) channels). Further, the label values may be stored as a separate image having the same height and width as image 900. Additionally, each of the areas may be stored separate binary image masks (e.g., an image mask with only the face area masked, or de-masked, etc.). Further, although only several areas are segmented in the example of FIG. 9B, it is appreciated that smaller features and areas could likewise be tracked. For example, a mouth area within the face area 925 can be segmented and masked for processing (e.g., shifting the mouth pixels from a smile shape to a frown shape).

FIG. 9C shows an example modified image 935 which has undergone style transfer from a smile style to a frown style using an image mask (e.g., an eye area image mask, a mouth area image mask). After the modified image is generated, it can be published via as an ephemeral message 504. In the above example, two sparse pruned networks are implemented: a first sparsely pruned neural network segments the image and a second sparsely pruned neural network performs style transfer to shift the smile face gesture to a frown face gesture. Additional reduced size neural networks can similarly be implemented to perform different mobile device based imaging tasks.

Figure 10:
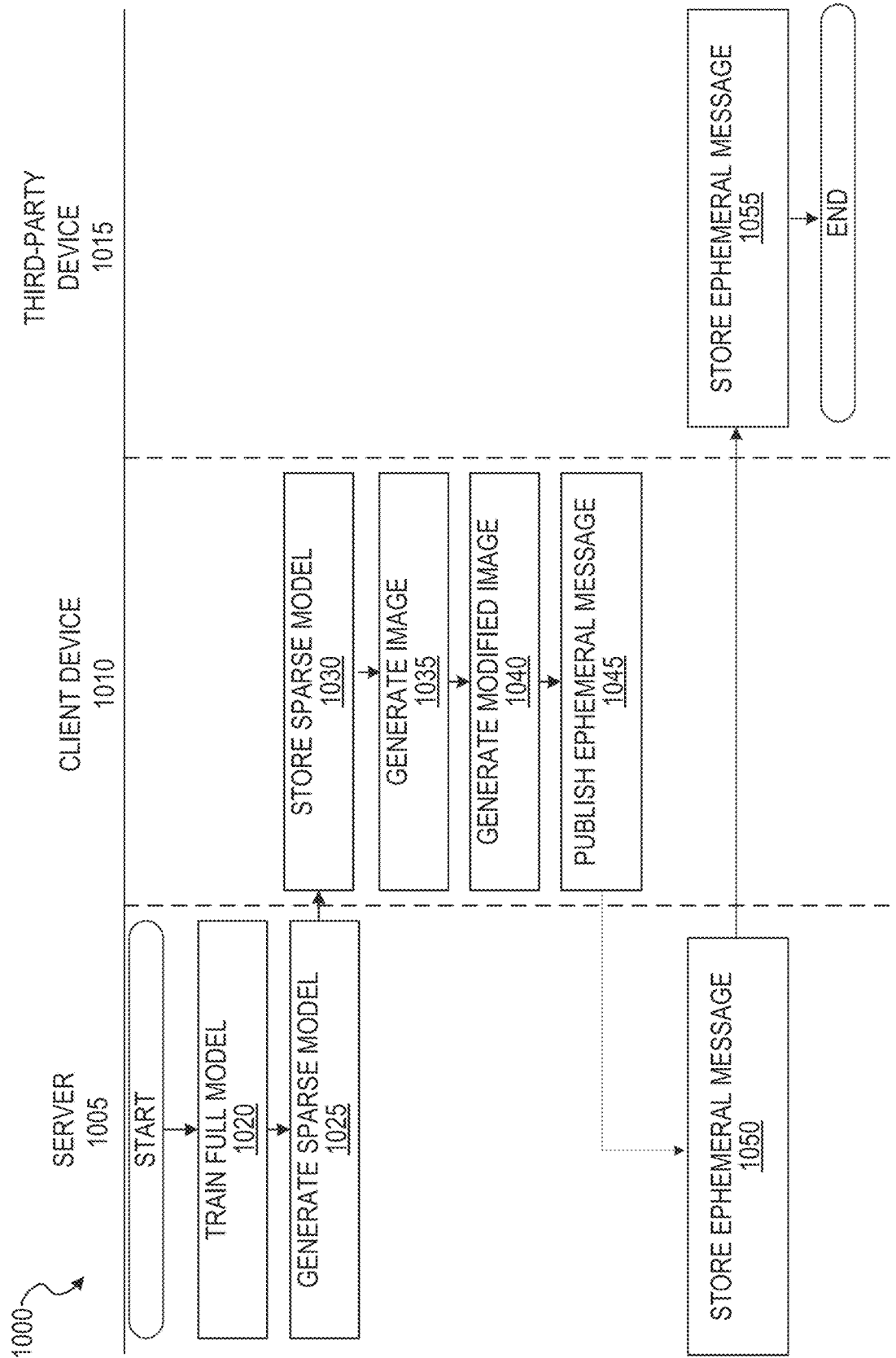
FIG. 10 shows an example network channel diagram, according to some example embodiments.

FIG. 10 shows an example network channel diagram 1000, according to some example embodiments. The first column corresponds to actions performed by the server 1005 (e.g., via the server-side sparse optimizer system 605), the second column corresponds to actions performed by client device 1010 (e.g., via the client-side sparse optimizer system 625), in the third column corresponds to actions performed by a third-party device 1015, such as other client devices of users connected to the user via social network system 122 (e.g., friend connections on a social network site). At operation 1020, the server-side sparse optimizer system 605 generates a trained full model. At operation 1025, the server-side sparse optimizer system 605 generates a sparsely pruned model using the pruning engine 615, and the sparsely pruned model is then sent to client device 1010.

At operation 1030, the client device 1010 receives and stores the sparse model. At operation 1035, the client device 1010 generates one or more images. At operation 1040, client device 1010 generates a modified image data using the sparse model. At operation 1045, the client device 1010 publishes the modified image data as an ephemeral message, for example, by transferring the image data to the server 1005.

At operation 1050, the network server 140 stores ephemeral message for access and downloading by other users (e.g., publishes the ephemeral message as a post accessible to friends connected to the user of client device 1010). At operation 1055, the third-party device 1015 (e.g. another user device running an instance of application 104) downloads the ephemeral message and displays the ephemeral message including the modified image is on their client device (e.g., third-party device 1015).

Figure 11A:
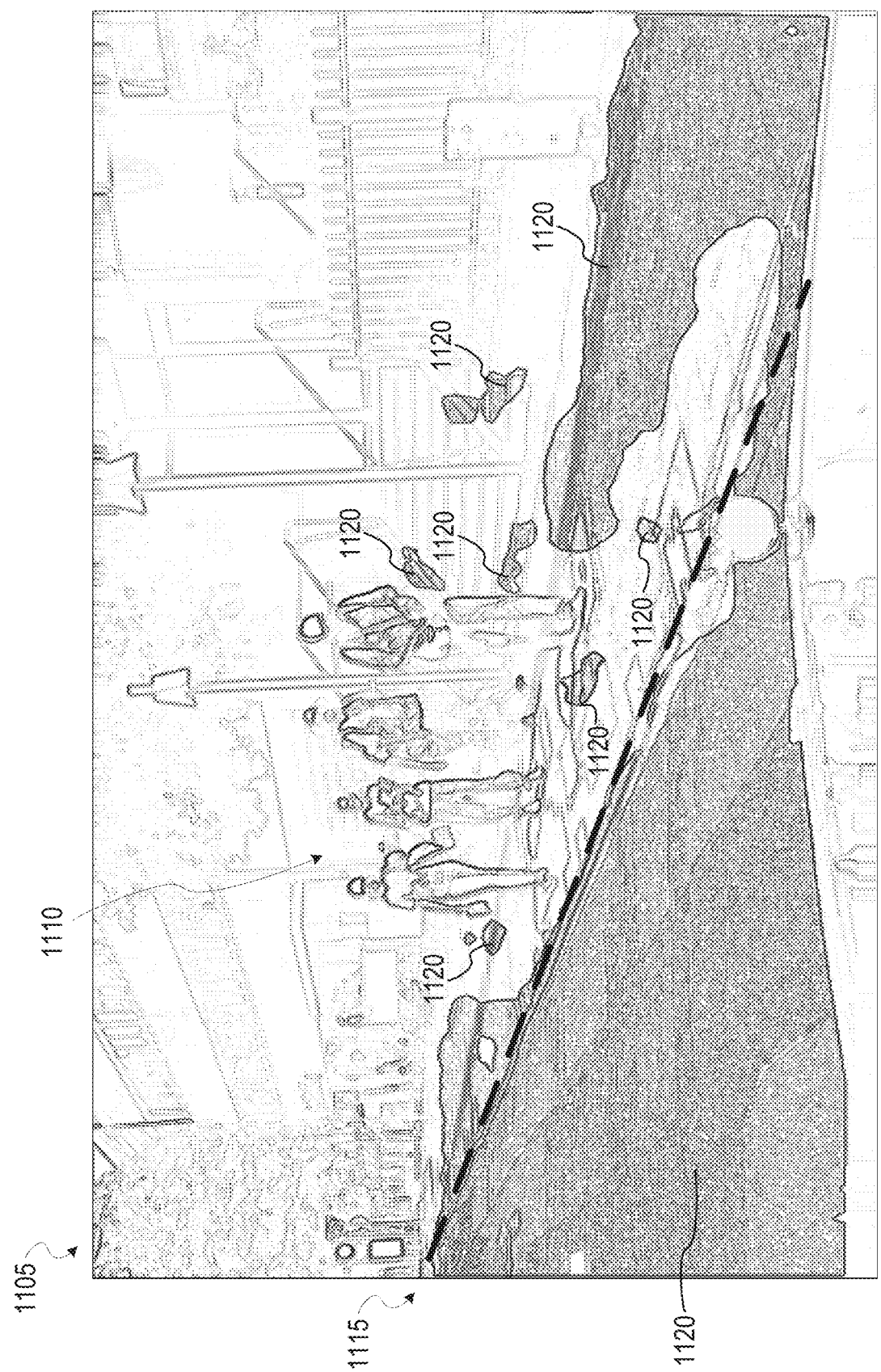
FIGS. 11A and 11B show example data outputs for comparison between channel segmentation and sparse parameter segmentation, according to some example embodiments.
Figure 11B:
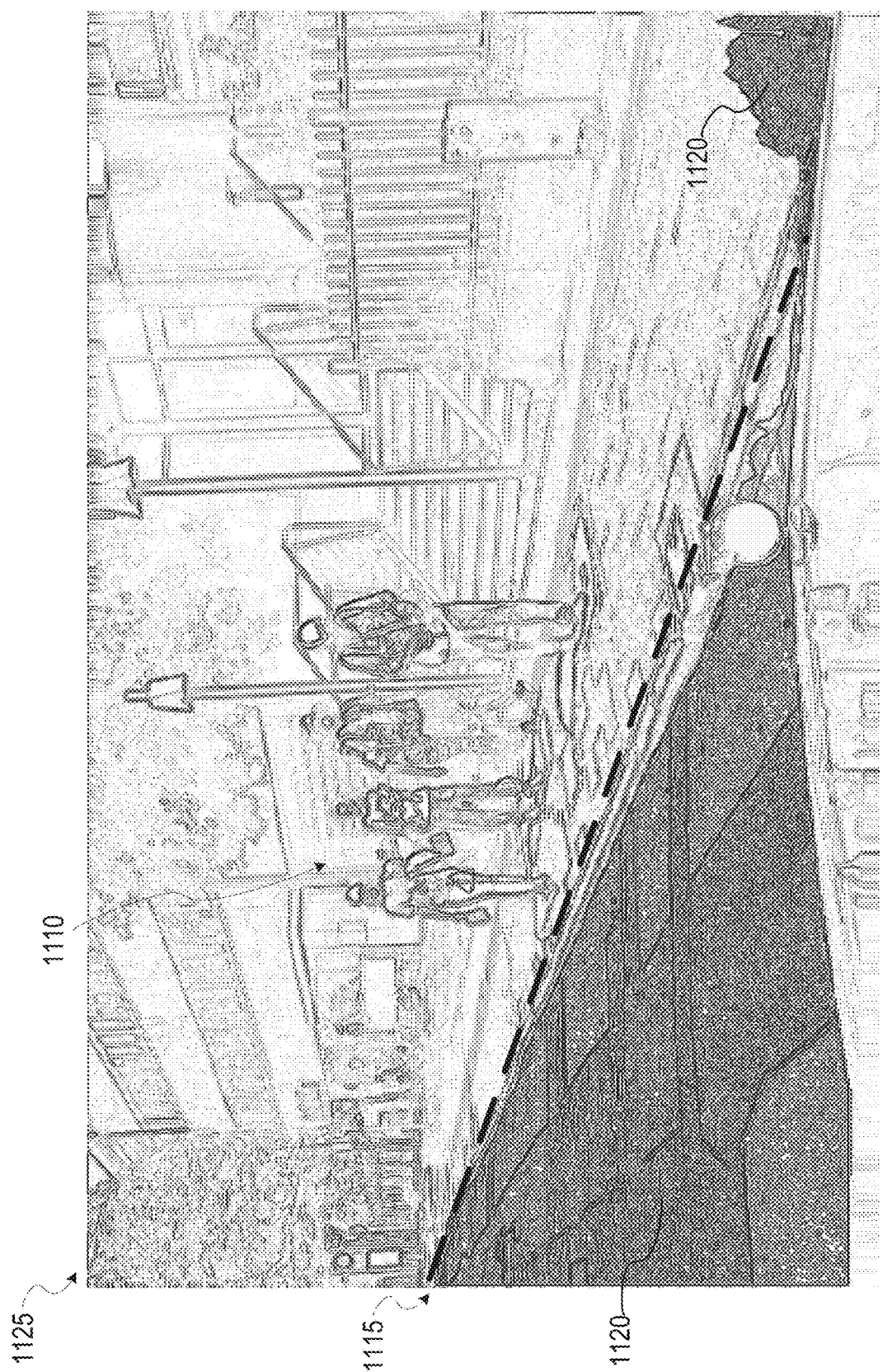

FIGS. 11A and 11B show example data outputs for comparison between channel segmentation and sparse parameter segmentation respectively, according to some example embodiments. Channel image mask data 1105 is an example segmentation output from a channel pruned model. In the channel image mask data 1105, the image being segmented is generated by a camera on an autonomous car. The scene depicted includes a group of people 1110 walking down a sidewalk area while the car traverses down a road, where the division between the road and the sidewalk is more clearly delineated by dotted line 1115. The car is configured with an autonomous navigation system that images the surrounding area (e.g., road, sidewalk, etc.), segments the road area to create a road image mask segment 1120 (shown as a shaded area) and then uses the road image mask segment 1120 to navigate the car. As illustrated in FIG. 11A, the channel model used to generate 1105 has incorrectly labeled portions of the sidewalk as corresponding to the road (e.g., the segmented areas in the road image mask segment 1120 that lie above the dotted line 1115).

FIG. 11B illustrates a sparsely pruned image mask data, according to some example embodiments. The sparsely pruned image mask data is generated by applying a sparsely pruned model on the client side (e.g., via client-side sparse optimizer system 625) to segment the road area to identify the road image mask segment 1120. As illustrated, the sparsely pruned image mask data 1125 is more accurate, as only a very small portion of the sidewalk is mislabeled as the road area, and the road image mask segment 1120 is highly accurate. In addition to being more accurate, the model size is smaller and faster to run on the edge device, such as the autonomous navigation system of the car.

Figure 12:
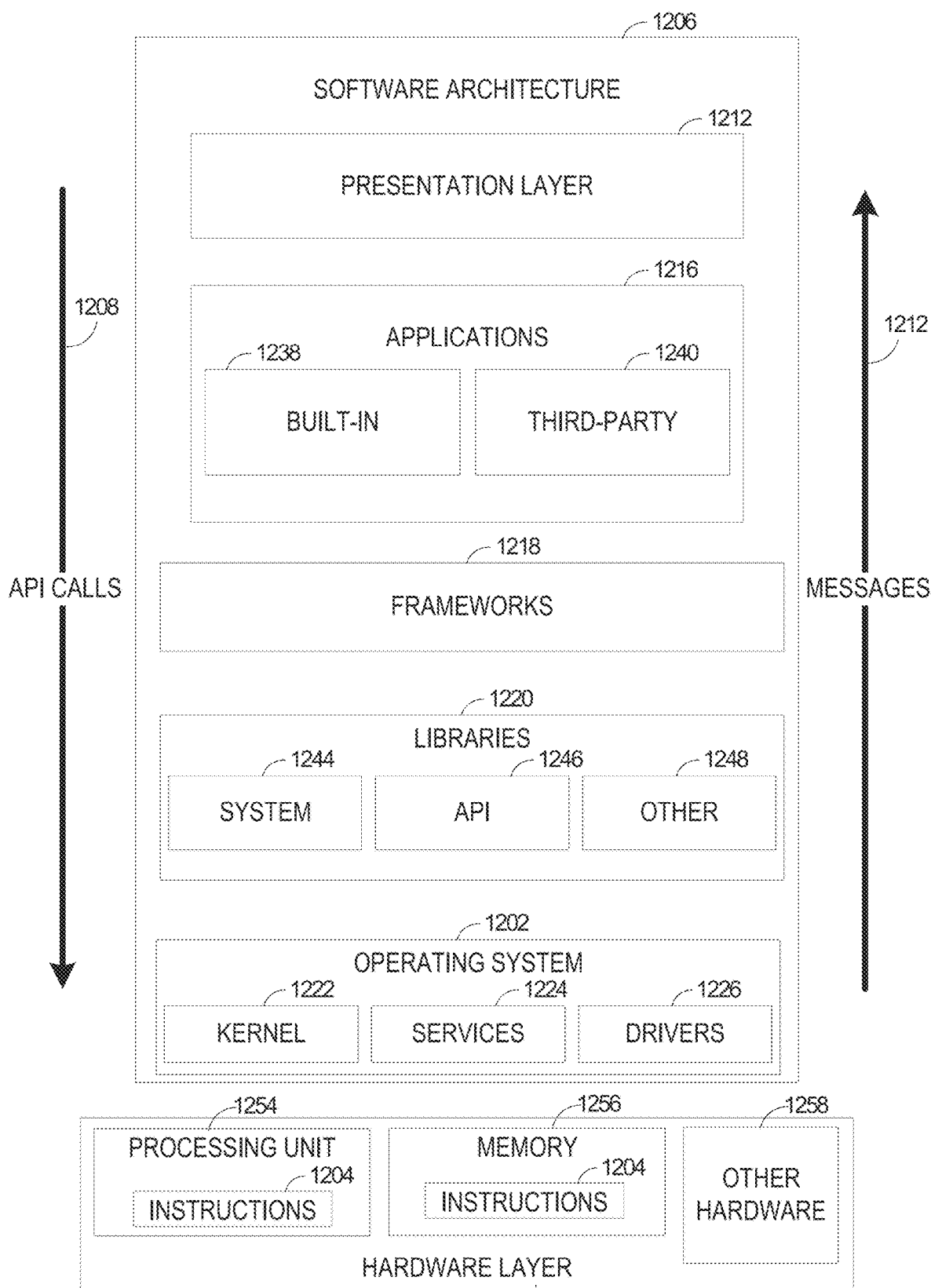
FIG. 12 is a block diagram illustrating a representative software architecture, which may be used in conjunction with various hardware architectures herein described.

FIG. 12 is a block diagram illustrating an example software architecture 1206, which may be used in conjunction with various hardware architectures herein described. FIG. 12 is a non-limiting example of a software architecture, and it will be appreciated that many other architectures may be implemented to facilitate the functionality described herein. The software architecture 1206 may execute on hardware such as a machine 1300 of FIG. 13 that includes, among other things, processors, memory, and I/O components. A representative hardware layer 1252 is illustrated and can represent, for example, the machine 1300 of FIG. 13. The representative hardware layer 1252 includes a processing unit 1254 having associated executable instructions 1204. The executable instructions 1204 represent the executable instructions of the software architecture 1206, including implementation of the methods, components, and so forth described herein. The hardware layer 1252 also includes a memory/storage 1256, which also has the executable instructions 1204. The hardware layer 1252 may also comprise other hardware 1258.

In the example architecture of FIG. 12, the software architecture 1206 may be conceptualized as a stack of layers where each layer provides particular functionality. For example, the software architecture 1206 may include layers such as an operating system 1202, libraries 1220, frameworks/middleware 1218, applications 1216, and a presentation layer 1212. Operationally, the applications 1216 and/or other components within the layers may invoke API calls 1208 through the software stack and receive a response in the form of messages 1212. The layers illustrated are representative in nature and not all software architectures have all layers. For example, some mobile or special-purpose operating systems may not provide a frameworks/middleware 1218, while others may provide such a layer. Other software architectures may include additional or different layers.

The operating system 1202 may manage hardware resources and provide common services. The operating system 1202 may include, for example, a kernel 1222, services 1224, and drivers 1226. The kernel 1222 may act as an abstraction layer between the hardware and the other software layers. For example, the kernel 1222 may be responsible for memory management, processor management (e.g., scheduling), component management, networking, security settings, and so on. The services 1224 may provide other common services for the other software layers. The drivers 1226 are responsible for controlling or interfacing with the underlying hardware. For instance, the drivers 1226 include display drivers, camera drivers, Bluetooth® drivers, flash memory drivers, serial communication drivers (e.g., Universal. Serial Bus (USB) drivers), Wi-Fi® drivers, audio drivers, power management drivers, and so forth depending on the hardware configuration.

The libraries 1220 provide a common infrastructure that is used by the applications 1216 and/or other components and/or layers. The libraries 1220 provide functionality that allows other software components to perform tasks in an easier fashion than by interfacing directly with the underlying operating system 1202 functionality (e.g., kernel 1222, services 1224, and/or drivers 1226). The libraries 1220 may include system libraries 1244 (e.g., C standard library) that may provide functions such as memory allocation functions, string manipulation functions, mathematical functions, and the like. In addition, the libraries 1220 may include API libraries 1246 such as media libraries (e.g., libraries to support presentation and manipulation of various media formats such as MPEG4, H.264, MP3, AAC, AMR, JPG, or PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1220 may also include a wide variety of other libraries 1248 to provide many other. APIs to the applications 1216 and other software components/modules.

The frameworks/middleware 1218 provide a higher-level common infrastructure that may be used by the applications 1216 and/or other software components/modules. For example, the frameworks/middleware 1218 may provide various graphic user interface (GUI) functions, high-level resource management, high-level location services, and so forth. The frameworks/middleware 1218 may provide a broad spectrum of other APIs that may be utilized by the applications 1216 and/or other software components/modules, some of which may be specific to a particular operating system 1202 or platform.

The applications 1216 include built-in applications 1238 and/or third-party applications 1240. Examples of representative built-in applications 1238 may include, but are not limited to, a contacts application, a browser application, a book reader application, a location application, a media application, a messaging application, and/or a game application. The third-party applications 1240 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1240 may invoke the API calls 1208 provided by the mobile operating system (such as the operating system 1202) to facilitate functionality described herein.

The applications 1416 may use built-in operating system functions (e.g., kernel 1222, services 1224, and/or drivers 1226), libraries 1220, and frameworks/middleware 1218 to create user interfaces to interact with users of the system. Alternatively, or additionally, in some systems, interactions with a user may occur through a presentation layer, such as the presentation layer 1212. In these systems, the application/component "logic" can be separated from the aspects of the application/component that interact with a user.

Figure 13:
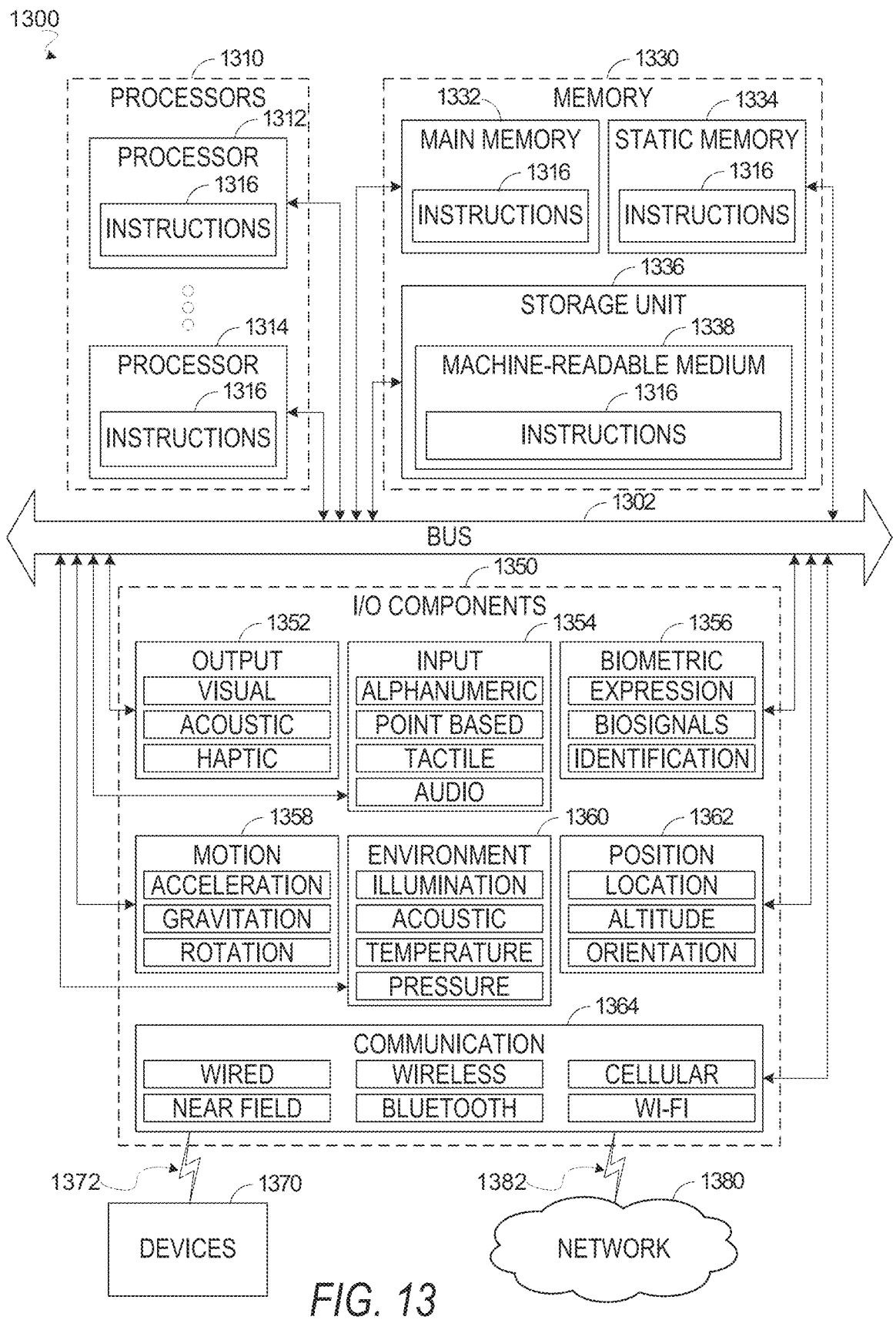
FIG. 13 is a block diagram illustrating components of a machine, according to some example embodiments, able to read instructions from a machine-readable medium (e.g., a machine-readable storage medium) and perform any one or more of the methodologies discussed herein.

FIG. 13 is a block diagram illustrating components of a machine 1300, according to some example embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1316 (e.g., software, a program, an application, an applet, an app, or other executable code) for causing the machine 1300 to perform any one or more of the methodologies discussed herein may be executed. As such, the instructions 1356 may be used to implement modules or components described herein. The instructions 1316 transform the general, non-programmed machine 1300 into a particular machine 1300 programmed to carry out the described and illustrated functions in the manner described. In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1316, sequentially or otherwise, that specify actions to be taken by the machine 1300. Further, while only a single machine 1300 is illustrated, the term "machine" shall also be taken to include a collection of machines that individually or jointly execute the instructions 1316 to perform any one or more of the methodologies discussed herein.

The machine 1300 may include processors 1310, memory/storage 1330, and I/O components 1350, which may be configured to communicate with each other such as via a bus 1302. The memory/storage 1330 may include a main memory 1332, static memory 1334, and a storage unit 1336, both accessible to the processors 1310 such as via the bus 1302. The storage unit 1336 and memory 1332 store the instructions 1316 embodying any one or more of the methodologies or functions described herein. The instructions 1316 may also reside, completely or partially, within the memory 1332, within the storage unit 1336 (e.g., on machine readable-medium 1338), within at least one of the processors 1310 (e.g., within the processor cache memory accessible to processors 1312 or 1313), or any suitable combination thereof, during execution thereof by the machine 1300. Accordingly, the memory 1332, the storage unit 1336, and the memory of the processors 1310 are examples of machine-readable media.

The I/O components 1350 may include a wide variety of components to receive input, provide output, produce output, transmit information, exchange information, capture measurements, and so on. The specific I/O components 1350 that are included in a particular machine 1300 will depend on the type of machine. For example, portable machines such as mobile phones will likely include a touch input device or other such input mechanisms, while a headless server machine will likely not include such a touch input device. It will be appreciated that the I/O components 1350 may include many other components that are not shown in FIG. 13. The I/O components 1350 are grouped according to functionality merely for simplifying the following discussion and the grouping is in no way limiting. In various example embodiments, the I/O components 1350 may include output components 1352 and input components 1354. The output components 1352 may include visual components (e.g., a display such as a plasma display panel (PDP), a light-emitting diode (LED) display, a liquid-crystal display (LCD), a projector, or a cathode ray tube (CRT)), acoustic components (e.g., speakers), haptic components (e.g., a vibratory motor, resistance mechanisms), other signal generators, and so forth. The input components 1354 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1350 may include biometric components 1356, motion components 1358, environment components 1360, or position components 1362 among a wide array of other components. For example, the biometric components 1356 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1358 may include acceleration sensor components (e.g., accelerometer), gravitation sensor components, rotation sensor components (e.g., gyroscope), and so forth. The environment components 1360 may include, for example, illumination sensor components (e.g., photometer), temperature sensor components (e.g., one or more thermometers that detect ambient temperature), humidity sensor components, pressure sensor components (e.g., barometer), acoustic sensor components one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1362 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1350 may include communication components 1364 operable to couple the machine 1300 to a network 1380 or devices 1370 via a coupling 1382 and a coupling 1372, respectively. For example, the communication components 1364 may include a network interface component or other suitable device to interface with the network 1380. In further examples, the communication components 1364 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1370 may be another machine or any of a wide variety of peripheral devices (e.g., a peripheral device coupled via a USB).

Moreover, the communication components 1364 may detect identifiers or include components operable to detect identifiers. For example, the communication components 1364 may include radio frequency identification (RFID) tag reader components, NFC smart tag detection components, optical reader components (e.g., an optical sensor to detect one-dimensional barcodes such as Universal Product Code (UPC) barcode, multi-dimensional barcodes such as Quick Response (QR) code, Aztec code, Data Matrix, Dataglyph, MaxiCode, PDF418, Ultra Code, UCC RSS-2D barcode, and other optical codes), or acoustic detection components (e.g., microphones to identify tagged audio signals). In addition, a variety of information may be derived via the communication components 1364, such as location via Internet Protocol (IP) geolocation, location via Wi-Fi® signal triangulation, location via detecting an NFC beacon signal that may indicate a particular location, and so forth.

"CARRIER SIGNAL" in this context refers to any intangible medium that is capable of storing, encoding, or carrying instructions 1316 for execution by the machine 1300, and includes digital or analog communications signals or other intangible media to facilitate communication of such instructions 1316. Instructions 1316 may be transmitted or received over the network 1380 using a transmission medium via a network interface device and using any one of a number of well-known transfer protocols.

"CLIENT DEVICE" in this context refers to any machine 1300 that interfaces to a network 1380 to obtain resources from one or more server systems or other client devices 102. A client device 102 may be, but is not limited to, a mobile phone, desktop computer, laptop, PDA, smartphone, tablet, ultrabook, netbook, multi-processor system, microprocessor-based or programmable consumer electronics system, game console, set-top box, or any other communication device that a user may use to access a network 1380.

"COMMUNICATIONS NETWORK" in this context refers to one or more portions of a network 1380 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network 1380 may include a wireless or cellular network and the coupling 1382 may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"EPHEMERAL MESSAGE" in this context refers to a message 400 that is accessible for a time-limited duration. An ephemeral message 502 may be a text, an image, a video, and the like. The access time for the ephemeral message 502 may be set by the message sender. Alternatively, the access time may be a default setting, or a setting specified by the recipient. Regardless of the setting technique, the message 400 is transitory.

"MACHINE-READABLE MEDIUM" in this context refers to a component, a device, or other tangible media able to store instructions 1316 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EPROM)), and/or any suitable combination thereof. The term "machine-readable medium" should be taken to include a single medium or multiple media (e.g., a centralized or distributed database, or associated caches and servers) able to store instructions 1316. The term "machine-readable medium" shall also be taken to include any medium, or combination of multiple media, that is capable of storing instructions 1316 (e.g., code) for execution by a machine 1300, such that the instructions 1316, when executed by one or more processors 1310 of the machine 1300, cause the machine 1300 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor 1312 or a group of processors 1310) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine 1300) uniquely tailored to perform the configured functions and are no longer general-purpose processors 1310.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor 1312 configured by software to become a special-purpose processor, the general-purpose processor 1312 may be configured as respectively different special-purpose processors (e.g., comprising different hardware components) at different times. Software accordingly configures a particular processor 1312 or processors 1310, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors 1310 that are temporarily configured (e.g., by software) or permanently configured to perform the relevant operations. Whether temporarily or permanently configured, such processors 1310 may constitute processor-implemented components that operate to perform one or more operations or functions described herein. As used herein, "processor-implemented component" refers to a hardware component implemented using one or more processors 1310. Similarly, the methods described herein may be at least partially processor-implemented, with a particular processor 1312 or processors 1310 being an example of hardware. For example, at least some of the operations of a method may be performed by one or more processors 1310 or processor-implemented components. Moreover, the one or more processors 1310 may also operate to support performance of the relevant operations in a "cloud computing" environment or as a "software as a service" (SaaS). For example, at least some of the operations may be performed by a group of computers (as examples of machines 1300 including processors 1310), with these operations being accessible via a network 1380 (e.g., the Internet) and via one or more appropriate interfaces (e.g., an API). The performance of certain of the operations may be distributed among the processors 1310, not only residing within a single machine 1300, but deployed across a number of machines 1300. In some example embodiments, the processors 1310 or processor-implemented components may be located in a single geographic location (e.g., within a home environment, an office environment, or a server farm). In other example embodiments, the processors 1310 or processor-implemented components may be distributed across a number of geographic locations.

"PROCESSOR" in this context refers to any circuit or virtual circuit (a physical circuit emulated by logic executing on an actual processor 1312) that manipulates data values according to control signals (e.g., "commands," "op codes," "machine code," etc.) and which produces corresponding output signals that are applied to operate a machine 1300. A processor may, for example, be a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), or any combination thereof. A processor 1310 may further be a multi-core processor 1310 having two or more independent processors 1312, 1313 (sometimes referred to as "cores") that may execute instructions 1316 contemporaneously.

"TIMESTAMP" in this context refers to a sequence of characters or encoded information identifying when a certain event occurred, for example giving date and time of day, sometimes accurate to a small fraction of a second.

What is claimed is:

1. A method comprising:
receiving, at a client device, a sparsely pruned generative neural network model from a server that is configured to:
train a full generative neural network model, and
generate the sparsely pruned generative neural network model by: applying a sparse pruning optimizer that is agnostic to the full generative neural network model, and individually pruning parameters of the full generative neural network model;
generating an image on a client device;
generating, on the client device, image output data by applying the sparsely pruned generative neural network model to the image; and
storing the image output data on the client device;
generating a modified image based on the image output data; and
publishing the modified image as an ephemeral message on a social network site.

2. The method of claim 1, wherein the sparsely pruned generative neural network model is generated by pruning non-zero parameters in a parameter vector of the full generative neural network model based on gradient data in a gradient vector of the full generative neural network model.

3. The method of claim 2, wherein individually pruning parameters comprises zeroing non-zero parameters based on corresponding gradient data.

4. The method of claim 1, wherein the image output data is an image mask generated at least in part by segmentation of the image.

5. The method of claim 4, further comprising:
generating the modified image using the image mask; and
storing the modified image on the client device.

6. The method of claim 5, further comprising:
transmitting the modified image to another client device over a network.

7. The method of claim 1, wherein individually pruning parameters comprises zeroing non-zero parameters based on corresponding gradient data.

8. The method of claim 1, wherein generating the image output data further comprises:
applying the sparsely pruned generative neural network model to the image to generate image mask data labelling a region depicted in the image; and
applying an image effect to the region depicted in the image to generate the modified image.

9. The method of claim 8, wherein the modified image is part of a modified video sequence.

10. The method of claim 1, wherein publishing the modified image comprises sending the modified image to the social network site.

11. A client device comprising:
one or more processors of a machine; and
a memory storing instructions that, when executed by the one or more processors, cause the machine to perform operations comprising:
receiving, at a client device, a sparsely pruned generative neural network model from a server that is configured to:
train a full generative neural network model, and
generate the sparsely pruned generative neural network model by: applying a sparse pruning optimizer that is agnostic to the full generative neural network model, and individually pruning parameters of the full generative neural network model;
generating an image on a client device;
generating, on the client device, image output data by applying the sparsely pruned generative neural network model to the image;
storing the image output data on the client device;
generating a modified image based on the image output data; and
publishing the modified image as an ephemeral message on a social network site.

12. The client device of claim 11, wherein the sparsely pruned generative neural network is generated by pruning non-zero parameters in a parameter vector of the full generative neural network model based on gradient data in a gradient vector of the full generative neural network model.

13. The client device of claim 12, wherein individually pruning parameters comprises zeroing non-zero parameters based on corresponding gradient data.

14. The client device of claim 11, wherein the image output data is an image mask generated at least in part by segmentation of the image.

15. The client device of claim 14, the operations further comprising:
generating the modified image using the image mask; and
storing the modified image on the client device.

16. The client device of claim 15, the operations further comprising:
transmitting the modified image to another client device over a network.

17. The client device of claim 11, wherein individually pruning parameters comprises zeroing non-zero parameters based on corresponding gradient data.

18. A machine-readable storage device embodying instructions that, when executed by a machine, cause the machine to perform operations comprising:
receiving, at a client device, a sparsely pruned generative neural network model from a server that is configured to:
train a full generative neural network model, and
generate the sparsely pruned generative neural network model by: applying a sparse pruning optimizer that is agnostic to the full generative neural network model, and individually pruning parameters of the full generative neural network model;
generating an image on the client device;
generating, on the client device, image output data by applying the sparsely pruned generative neural network model to the image; and
storing the image output data on the client device;
generating a modified image based on the image output data; and
publishing the modified image as an ephemeral message on a social network site.

19. The machine-readable storage device of claim 18, wherein the sparsely pruned generative neural network model is generated by pruning non-zero parameters in a parameter vector of the full generative neural network model based on gradient data in a gradient vector of the full generative neural network model.

20. The machine-readable storage device of claim 19, wherein individually pruning parameters comprises zeroing non-zero parameters based on corresponding gradient data.

* * * * *

UNITED STATES PATENT AND TRADEMARK OFFICE
CERTIFICATE OF CORRECTION

| | | |
|---|---|---|
| PATENT NO. | : 11,580,400 B1 | Page 1 of 1 |
| APPLICATION NO. | : 16/586635 | |
| DATED | : February 14, 2023 | |
| INVENTOR(S) | : Yan et al. | |

It is certified that error appears in the above-identified patent and that said Letters Patent is hereby corrected as shown below:

In the Claims

In Column 23, Line 15, in Claim 1, after "image;", delete "and"

Signed and Sealed this
Twenty-seventh Day of February, 2024

*Katherine Kelly Vidal*

Katherine Kelly Vidal
*Director of the United States Patent and Trademark Office*